United States Patent
Arora et al.

(10) Patent No.: US 12,019,518 B2
(45) Date of Patent: Jun. 25, 2024

(54) SEAMLESS FALLBACK OF SOFTWARE PACKAGE DURING EXECUTION

(71) Applicant: Microsoft Technology Licensing, LLC, Redmond, WA (US)

(72) Inventors: Sanjeev Arora, Redmond, WA (US); Lawrence Glenn Landauer, Kettle Falls, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/898,019

(22) Filed: Aug. 29, 2022

(65) Prior Publication Data
US 2024/0070027 A1 Feb. 29, 2024

(51) Int. Cl.
G06F 11/14 (2006.01)
G06F 8/65 (2018.01)
G06F 8/71 (2018.01)

(52) U.S. Cl.
CPC ............ *G06F 11/1433* (2013.01); *G06F 8/65* (2013.01); *G06F 8/71* (2013.01); *G06F 2201/865* (2013.01)

(58) Field of Classification Search
CPC ............ G06F 11/1433; G06F 8/65; G06F 8/71
See application file for complete search history.

(56) References Cited

U.S. PATENT DOCUMENTS

| | | | |
|---|---|---|---|
| 7,047,448 B2 * | 5/2006 | Rao | G06F 8/65 717/124 |
| 10,379,838 B1 | 8/2019 | Chud | |
| 2010/0242032 A1 * | 9/2010 | Ladki | G06F 11/1433 717/171 |
| 2018/0067811 A1 | 3/2018 | Mowatt | |

OTHER PUBLICATIONS

"International Search Report and Written Opinion Issued in PCT Application No. PCT/US23/027594", dated Oct. 31, 2023, 9 Pages.

* cited by examiner

*Primary Examiner* — Nadeem Iqbal
(74) *Attorney, Agent, or Firm* — Schwegman Lundberg & Woessner, P.A.

(57) ABSTRACT

A method may include first executing an operation of an application using a function call of a first version of a package of the application; first detecting, by the application, an error in the first executing; in response to the first detecting, second executing the operation of the application using a function call of a second version of the package of the application; second detecting, by the application, that no error occurred during the second executing; and in response to the second detecting, electronically logging an error with respect to the function call of the first version of the package.

19 Claims, 5 Drawing Sheets

SEAMLESS FALLBACK OF SOFTWARE PACKAGE DURING EXECUTION

BACKGROUND

A software application will generally make use of several software packages. For example, an image manipulation package may include application programming interface (API) calls to rotate a graphic. A network package may include API calls to obtain a list of documents stored remotely. These packages themselves may include one or more libraries of prewritten code.

Packages are often updated to address security concerns, add new functionality, or address bug fixes. The updates may cause errors in functionality for an application that were not present in the prior version. Thus, an end user executing the application may not be able to perform some function due to an error that is present in the new package version with the old package. In these instances, the end user may request (e.g., to the software developer) a download of an older version of the application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a Web Server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless explicitly indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

This disclosure generally uses the term "application." An application is not limited to a stand-alone application that is downloaded or installed on a client device and executed locally. An application may include web-based application and services as well. An application may be considered executable code that makes use of one or more packages.

As indicated in the background, an application is created by using multiple packages (first-party or third-party packages), which uses the functionality of the package. The packages continue to evolve (e.g., to patch security vulnerabilities) and their newer versions are released by the package owners. Sometimes, as part of the evolution, older application programming interfaces (APIs) are deprecated, and new APIs are introduced to provide new functionality. To ensure that an application is using the most current functionality, the existing application is updated to include the newer version of the package.

Use of a newer package in an application is not risk free, however. Sometimes the use of a newer package breaks (e.g., causes errors) the application because of the different execution code—as compared to the older version of the package. Often as a result of the errors, the use of the older package is needed in order to maintain the functionality of the application. Consequently, the newer version of the package is removed from the application build and the older version is reintroduced.

The removal of the newer package creates its own set of technical problems. First, it is resource intensive (e.g., time, human, and computing due to the additional bandwidth to push out the updates). Second, the removal of the newer package means that any security fixes or additional functionality in the newer package is no longer available to the end user. The loss of functionality and security fixes may be due to a single deprecated API or error in the package. Accordingly, even if the error is unrelated to a security fix, the application remains vulnerable because of the use of the older package.

As discussed in more detail below, systems and methods described herein provide a solution to the technical problems above by distributing an application with multiple versions of a package. During execution of the application, if a function call fails using a newer version of the package, the application falls back to an older version of the package. If the function call succeeds with the older package, a record may be stored to use the older package for that functional call.

Having multiple versions of a package provides several benefits over prior application distribution systems and application execution. First, performance of the application may continue unimpeded, even if there is an error present in a newer version of a package. Second, any security, functionality, or performance improvements made in the newer version may still be made use of in the application. Third, error telemetry data may quickly be made available to the package developer and application developer who may determine if the error is systemic or more use case specific. For example, if the application developer is seeing a high level of errors for the package, a decision may be made to transmit a message to instruct the application to use the older package—as opposed to waiting for an error to occur. The package developer may use the data to fix the error more expediently and with the knowledge it is the change in version that caused the error (as opposed to a long existing error). Further benefits may be apparent to one having ordinary skill in the art upon review of this disclosure.

Figure 1:
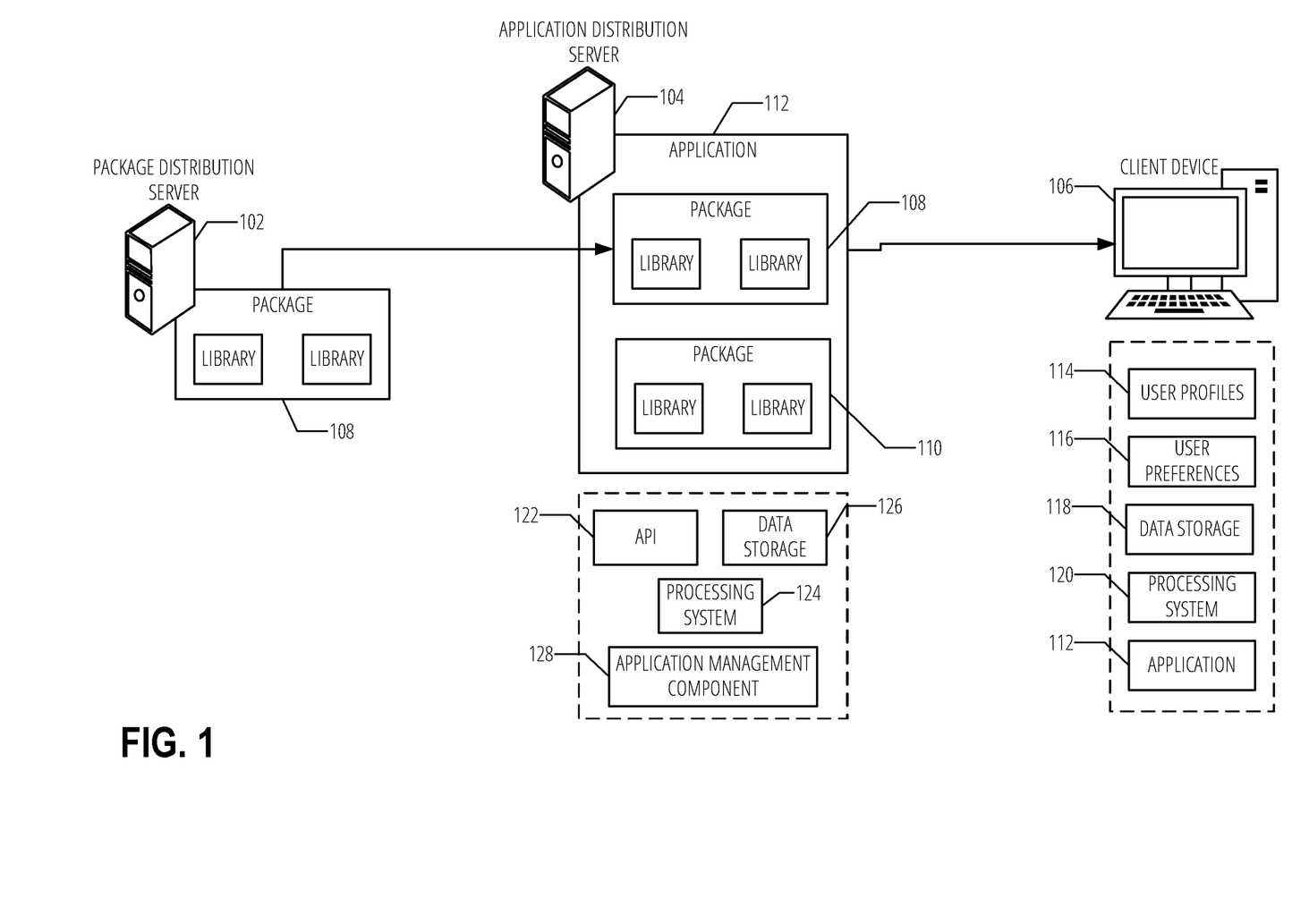
FIG. 1 is a schematic diagram of application distribution, according to various examples.

FIG. 1 is a schematic diagram of application distribution, according to various examples. The diagram includes package distribution server 102, application distribution server 104, and client device 106. In various examples, package distribution server 102 includes package 108; application distribution server 104 includes application 112 (which includes package 108), API 122, processing system 124, data storage 126, and application management component 128; and client device 106 includes user profiles 114, user preferences 116, data storage 118, processing system 120, and application 112. Although package distribution server 102 and application distribution server 104 are illustrated as separate servers, the functionality described for each may be implemented by a single server.

Although not illustrated, package distribution server 102, application distribution server 104, and client device 106 may communicate over a network. The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Application distribution server 104 may be a repository that serves (over a network) an application to client device 106. As indicated previously, application 112 need not be a standalone application but may be a web application hosted via a web server (not shown). Application 112 may include one or more packages such as package 108 and package 110. Package 108 may originate from package distribution server 102, in various examples.

A "library" (sometimes called a binary) is a collection of prewritten code. For example, within the Windows® operating system .lib and .dll files may be libraries, in Linux® .a, .so files may be libraries, and in MacOS®, .so, .dylib, and .framework files may be libraries. A "package" is a collection of libraries or sources files e.g., NuGet packages, Maven packages, .jar files, source files, etc. The term package should not be confused with the term package as used in Java type programming languages. In Java, the term "package" is more aligned with the term "namespace" in C++.

A namespace is a way to have disambiguate two APIs of the same name. Consider the following code, written in C++.

namespace X { void DoSomething( ); }
namespace Y { void DoSomething( ); }

When the application code internally calls X.DoSomething( ) or Y.DoSomething( ) then the executing system can disambiguate between the two methods with same name 'DoSomething'. Here, 'X' and 'Y' are two different namespaces. Finally, a functional unit may be considered a code execution path inside an application.

In various examples, communications between package distribution server 102, application distribution server 104, and client device 106 occur using an application programming interface (API) such as API 122. An API provides a method for computing processes (or devices) to exchange data. A web-based API (e.g., API 122) may permit package distribution server 102 to send updates of application 112 to client device 106. Similarly, client device 106 may request an application update from application distribution server 104 using API 122. An API may define a set of HTTP calls according to Representational State Transfer (RESTful) practices. For examples, A RESTful API may define various GET, PUT, POST, DELETE methods to create, replace, update, and delete data stored in a database (e.g., data storage 126 or data storage 118). Although not illustrated, package distribution server 102 and client device 106 may include APIs as well.

API 122 may also define calls for reporting telemetry data from client device 106 with respect to application 112. For example, if a call to an API within application 112 fails for a package version, that information may be relayed to application distribution server 104. Using application management component 128, for example, the telemetry data from multiple devices may be collected and analyzed. If a certain percentage of computing devices report an error for a package version, a message or alert may be transmitted to an administrative user. The administrative user (or an automated process) may determine to initiate a rollback of the latest update to application 112. Furthermore, a message (e.g., an API call) may be transmitted to package distribution server 102 with the telemetry data for debugging purposes.

In addition to telemetry collection, application management component 128 may manage the distribution of applications to client devices. For example, if application 112 is updated, a notification may be transmitted to client device 106. If auto-updates are enabled, or if a user manually indicates to update application 112 (as it currently exists on client device 106), application management component 128 may send the updated application. The application may be transmitted from application distribution server 104 or via a content delivery network, in various examples.

The functionality described for application distribution server 104 may be executed using processing system 124.

For example, computer program code (e.g., of application management component 128) may be stored on a storage device (e.g., data storage 126) and loaded into a memory of the processing system 124 for execution. Portions of the program code may be executed in a parallel across multiple processing units (e.g., a core of a general-purpose computer processor, a graphical processing unit, an application specific integrated circuit, etc.) of processing system 124. Execution of the code may be performed on a single device or distributed across multiple devices. In some examples, the program code may be executed on a cloud platform (e.g., MICROSOFT AZURE® and AMAZON EC2®) using shared computing infrastructure.

Data storage 126 may store data that is used by application distribution server 104. Data storage 126 is depicted as singular element but may in actuality be multiple data stores. The specific storage layout and model used in by data storage 126 may take a number of forms—indeed, a data storage 126 may utilize multiple models. Data storage 126 may be, but is not limited to, a relational database (e.g., SQL), non-relational database (NoSQL) a flat file database, object model, document details model, graph database, shared ledger (e.g., blockchain), or a file system hierarchy. Data storage 126 may store data on one or more storage devices (e.g., a hard disk, random access memory (RAM), etc.). The storage devices may be in standalone arrays, part of one or more servers, and may be located in one or more geographic areas.

Client device 106 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Application 112 may support multiple users, each with their own user identifier. The user identifier may be an email address in various examples. The email address may also be used as the login identifier to enable client device 106 to download application 112 from application distribution server 104. Application 112 may include an option to logout (or switch) a current user and login with another user. Each user may have their own user profile stored in user profiles 114 with their own respective preferences (e.g., user preferences 116).

Consider that application 112 is a word processing application. In such an instance, user preferences 116 may include application 112 specific preferences such as a default font style, inclusion or exclusion of shortcuts in a menu bar, how often to auto-save, etc., that relate to functionality of the application 112 assuming no errors.

In addition to the application specific preferences, user preferences 116 may include error handling preferences. The error handling preferences may be set by the application developer instead of the user in various examples. Error handling preferences may include settings of how to handle errors occurring in a version of a package of application 112. Application 112 may include a user preference user interface that is configured to receive a selection of the error handling preferences. For example, the user interface may include an option to always fall back to an earlier version if an error has been previously detected using a newer version. In this manner, application 112 may operate more efficiently because there is no need to try an operation with the newer version of the package again. This setting may be specific to the API call that failed, and an entry may be made in a table indicating the success Thus, functions that operated successfully with the newer package may continue to do so.

Client device 106 may execute application 112 using processing system 120. For example, computer program code of application 112 may be stored on a storage device (e.g., data storage 118) and loaded into a memory of the processing system 120 for execution. Portions of the program code may be executed in a parallel across multiple processing units (e.g., a core of a general-purpose computer processor, a graphical processing unit, an application specific integrated circuit, etc.) of processing system 120. Execution of the code may be performed on a single device or distributed across multiple devices. In some examples, the program code may be executed on a cloud platform (e.g., MICROSOFT AZURE® and AMAZON EC2®) using shared computing infrastructure.

Data storage 118 may store data that is used by client device 106. Data storage 118 is depicted as singular element but may in actuality be multiple data stores. The specific storage layout and model used in by data storage 118 may take a number of forms—indeed, a data storage 118 may utilize multiple models. Data storage 118 may be, but is not limited to, a relational database (e.g., SQL), non-relational database (NoSQL) a flat file database, object model, document details model, graph database, shared ledger (e.g., blockchain), or a file system hierarchy. Data storage 118 may store data on one or more storage devices (e.g., a hard disk, random access memory (RAM), etc.). The storage devices may be in standalone arrays, part of one or more servers, and may be located in one or more geographic areas.

Figure 2:
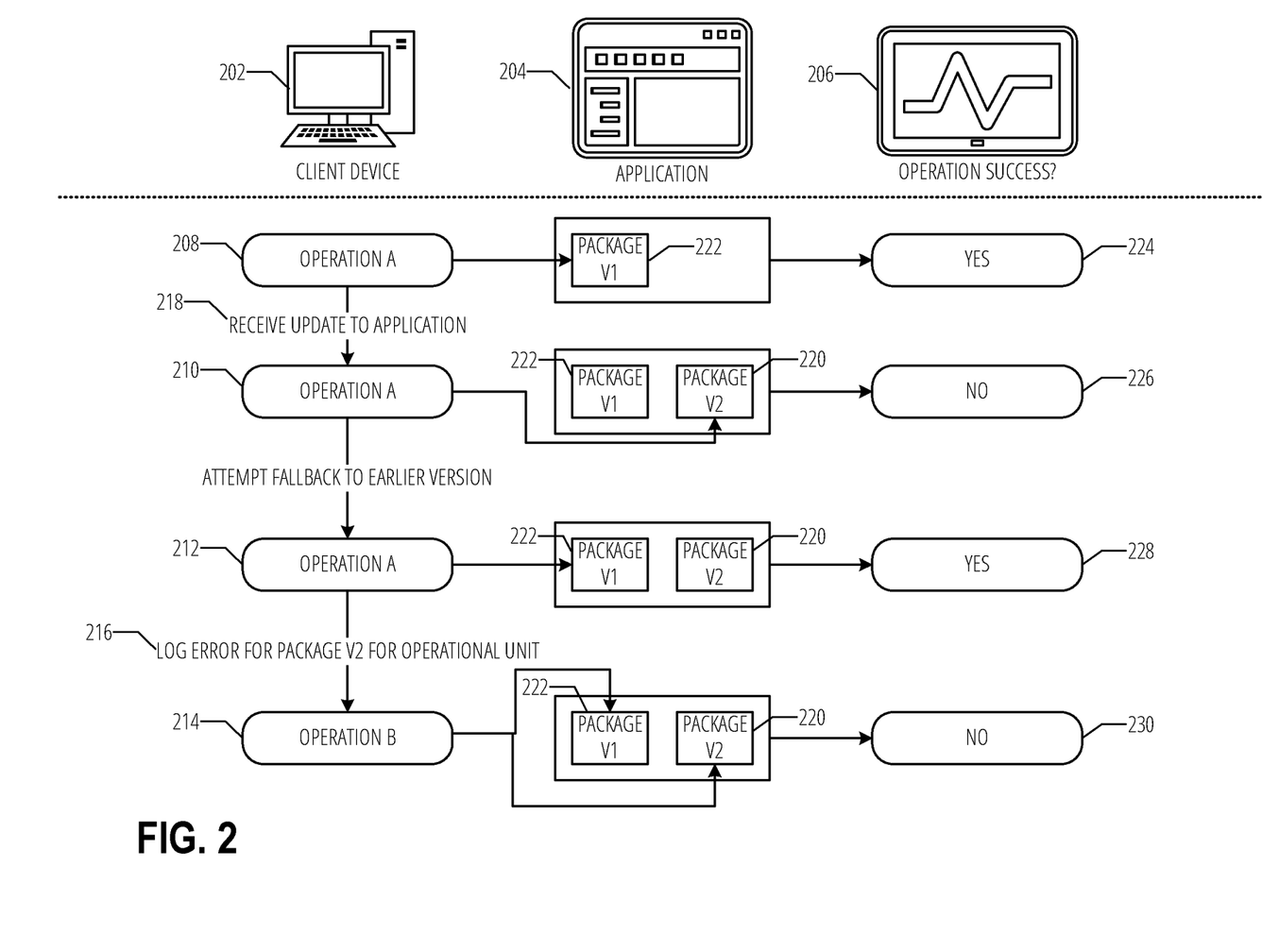
FIG. 2 is a graphical representation of package fallback, according to various examples

FIG. 2 is a graphical representation of a package fallback method, according to various examples. The versions of the package discussed may be for the same package. FIG. 2 illustrates client device 202, which may be a device such as client device 106, and application 204, which may be an application distributed to client device 202 as described in FIG. 1, and operational success column 206.

Consider that initially client device 202 has application 204 installed with version 1 of original package 222. Next, operation 208 is executed. An operation may be a code execution path inside an application that uses a package. With respect to FIG. 2, operation 208 may be a "GetLocalFileNames( )" operation. Because there is currently only one version of the package in application 204, operation 208 is executed using original package 222. Result 224 indicates that operation 208 was a success. Operational success may mean the absence of an error occurring during execution of operation 208.

After a period of time an update of application 204 (e.g., application update 218) may be pushed to client device 202. Application update 218 may include a new version of the package (new package version 220). The new package version 220 may be an update to the same package of original package 222. After application update 218, application 204 keeps original package 222 and adds new package version 220.

Subsequent to updating, operation 210 is executed. As illustrated, operation 210 is the same function as operation 208 (e.g., same function as operation 208, but called from newer package 220). In various examples, the first time an operation is executed after an update, the newest package version available may be used for the operation. Thus, new package version 220 may attempt to execute operation 210 first. Here, result 226 indicates that operation 210 failed. A failure may mean that the code execution path was not present in the package, an internal error checking function was triggered, etc.

In various examples, the display of an error to a user of the failure may be suppressed if another version of the package exists. Accordingly, in the scenario of FIG. 2, no error is shown after result 226. Instead, application 204 performs attempts to fallback to an earlier version of the package. Thus, at operation 212, the GetLocalFileNames( ) operation is attempted using original package 222. In this case, result 228 indicates that operation 212 was performed successfully. The success infers that there is a problem with the GetLocalFileNames( ) operation in new package version 220, but not in original package 222.

Because of the knowledge that the error was due to a package upgrade, log error 216 operation may be performed. Logging the error may include transmitting telemetry data of application 204 to the package provider (e.g., package distribution server 102). The telemetry data may include memory dumps, variable settings, debugging output, etc., that may be used by the package developer to investigate the error. Logging the error may also include transmitting the telemetry data to the application developer. As indicated above, the application developer may determine that the error rate is high enough to pull the new package version 220 from application 204.

In various example, the error may also be logged within application 204. Logging an error for application 204 may include an indication that an operational unit failed to execute. The type of parameters of the operational unit may be set according to a developer of application 204. An operational unit may be a method, a structured code entity, a thread in a process, a subprocess in application 204 or a service, or combinations thereof. An additional parameter of the operational unit may be a user identifier that is logged into the application.

For example, an operational unit may be a combination of a function name (e.g., GetLocalFileNames( ) and version of the package. Once an operational unit is indicated as a failure, an entry may be generated and added in an error table (e.g., using an API) or other storage medium linking the failure and the operational unit. Then, prior to executing the same operational unit again, application 204 may check the table (e.g., using the API or database query). If an entry exists for the operational unit that indicates a failure, the function may be performed using the original package 222 instead of trying new package version 220.

In additional to function name, the operational unit may be a combination of an identifier of a user logged in, and currently using, application 204 and the function name. For example, consider that there are two users with identifiers ID1 and ID2 and operation 208 was performed with ID1 using application 204. Therefore, the failed operational unit would be the combination of ID1 and GetLocalFileNames( ). Accordingly, if application 204 performs the GetLocalFileNames( ) function with ID2 as the current user, original package 222 would still be used. The use of original package 222 is due to the fact that there would be no operational unit entry with ID2 and the GetLocalFileNames( ) function name. If the GetLocalFileNames( ) operation fails for the ID2 user and original package 222, but succeeds with new package version 220, another entry may be made in the error table. Conversely, if the operation succeeds for user ID2, no entry may be made in the error table. Accordingly, even if application 204 has failed before using GetLocalFileNames( ) for one user, it does not meet that applications 204 automatically reverts back to original package 222 for another user.

Another operational unit may be thread based. For example, a developer of application 204 may configure application 204 to use multiple threads, one for each version of a package. For example, a first thread (TH1) may be assigned to and execute original package 222, and a second thread (TH2) may be assigned to execute new package version 220. When a function is called (e.g., GetLocalFileNames) if TH2 fails, but TH1 succeeds, an error may be logged indicating a problem with the operational unit of thread identifier and function (e.g., TH2::GetLocalFileNames). Another operational unit may use subprocesses instead of threads. Thus, if the subprocess assigned to new package version 220 fails, the results of the subprocess assigned to original package 222 may be used without showing an error to the user. An operational unit may be a combination of threads, function names, and user identifiers. Thus, an error may be logged for an operational unit of TH1::GetFileNames(ID1).

The above examples assume the existence of two package versions, but more package versions may be used. For example, an update to application 204 may include a third version of a package. Accordingly, application 204 may execute an operation with newest version first and work backwards to determine if any of the packages execute the operation successfully. Similarly, if threads are used, there may be three threads that execute the operation—one for each version of the package. When errors occur, notifications may be transmitted to the package owner to determine the cause of the error.

In some instances, an error that occurs is not due to a change in package version. For example, operation 214 may be a GetCloudFileNames call that fails for both original package 222 and new package version 220 (e.g., result 230). Once it has been determined that the error is not due to the package version (because all available package versions failed), an error may be presented to the user. Additional information may be logged to indicate that future attempts to execute the GetCloudFileNames functions do not need to attempt the operation using prior package versions.

Figure 3:
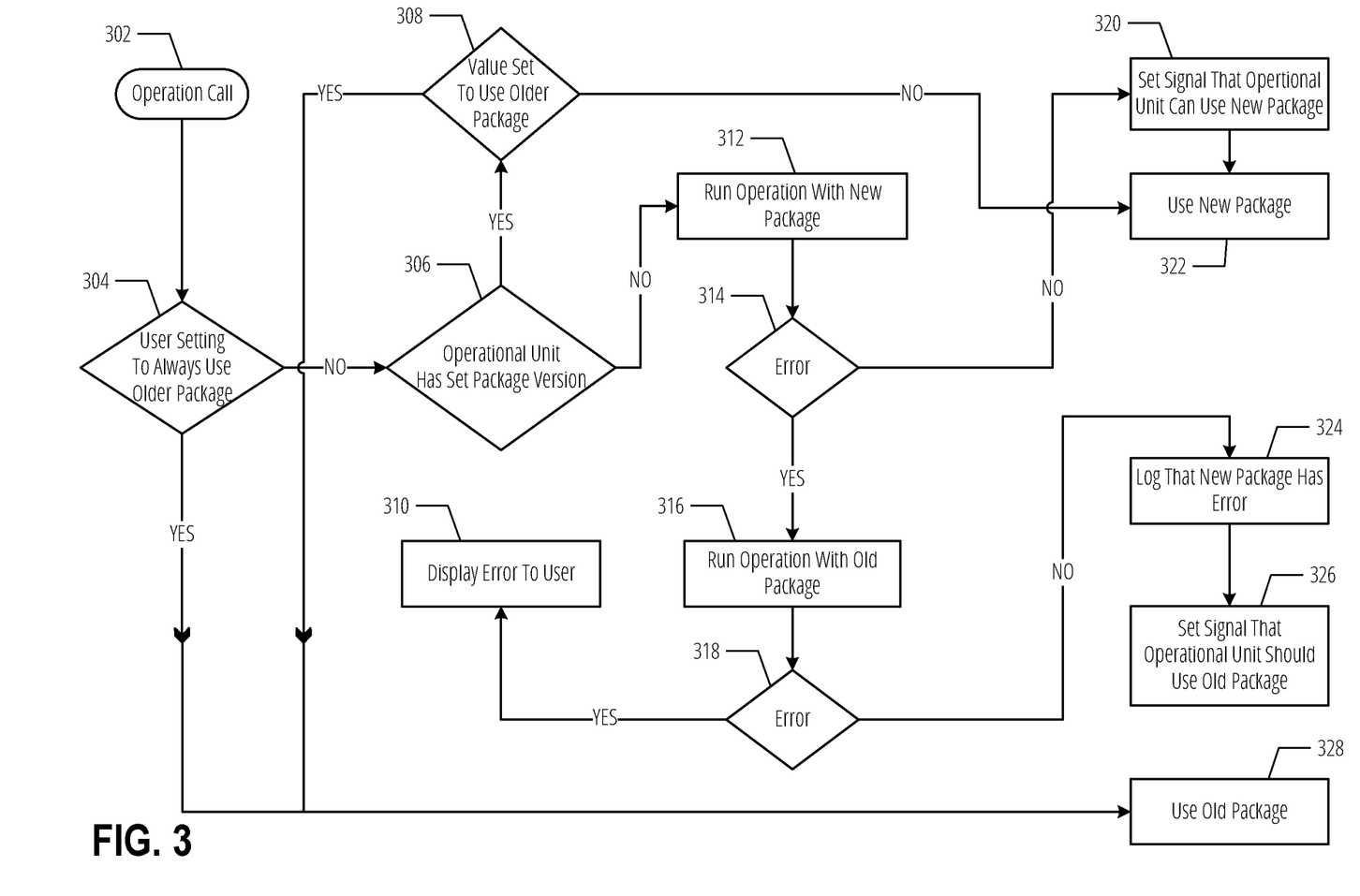
FIG. 3 is a flowchart illustrating a method of determining a package version to use for an operation, according to various examples.

FIG. 3 is a flowchart illustrating a method of determining a package version to use for an operation, according to various examples. The operations of the flowchart may be the logic used when receiving a function call to execute for an application. The method illustrated by the flowchart may be performed by a computer device such as by using processing system 120 of client device 106, in various examples. The method assumes that two versions of a package are available to an application for executing operations.

At operation 302, an operation call is to be executed in an application (e.g., application 112). At decision block 304 it is determined (e.g., by accessing a stored preference) if a user setting has been set to always use an older package—assuming more than one version of a package exists. If the user setting indicates to use an older package, operation call may be performed using the old package at operation 328. The stored preference may identify a version of the package to use to distinguish between multiple installed versions.

If no user setting has been set to always use an older package, decision block 306 determines if the operational unit used by the developer has a set package version. For example, a database table may be queried using the operational unit of the operation call of operation 302 to determine if (1) an entry exists for the operational unit; and if so (2) which package version to use.

If decision block 306 indicates an entry exists, flow may continue to decision block 308 to determine if the value for the operational unit indicates to use an older package version. If the determination is in the affirmative, flow may continue to operation 328 to use the older version of the package for operation 302. Conversely, if the value for the operational unit is to use the new package, flow continues to operation 322 in which the new package is used to perform operation 302.

If decision block 306 determines a value has not been set for the operational unit, flow continues to operation 312 to attempt to perform operation 302 with the new package. Decision block 314 determines if the result of operation 312 is an error. If the operation was successful, flow continues to operation 320. Operation 320 may set a signal (e.g., add an entry to a table) that the operational unit can use the new package.

If decision block 314 indicates an error has occurred, operation 316 may be performed in which the operation 302 is performed using the old package. Decision block 318 indicates whether operation 302 was successful with the old package or if an error occurred. If there was an error, operation 310 is performed in which an error is displayed to a user indicating the operation failed.

Conversely, if no error is detected after operation 316, operation 324 may be performed which logs an error that the operational unit for the new package has an error. Logging the error may further include transmitting operational telemetry data to the package owner (which may be stored as part of the package) to debug the error. At operation 326, a signal (e.g., an entry in a table) may be made that the operational unit should use the old package.

Figure 4:
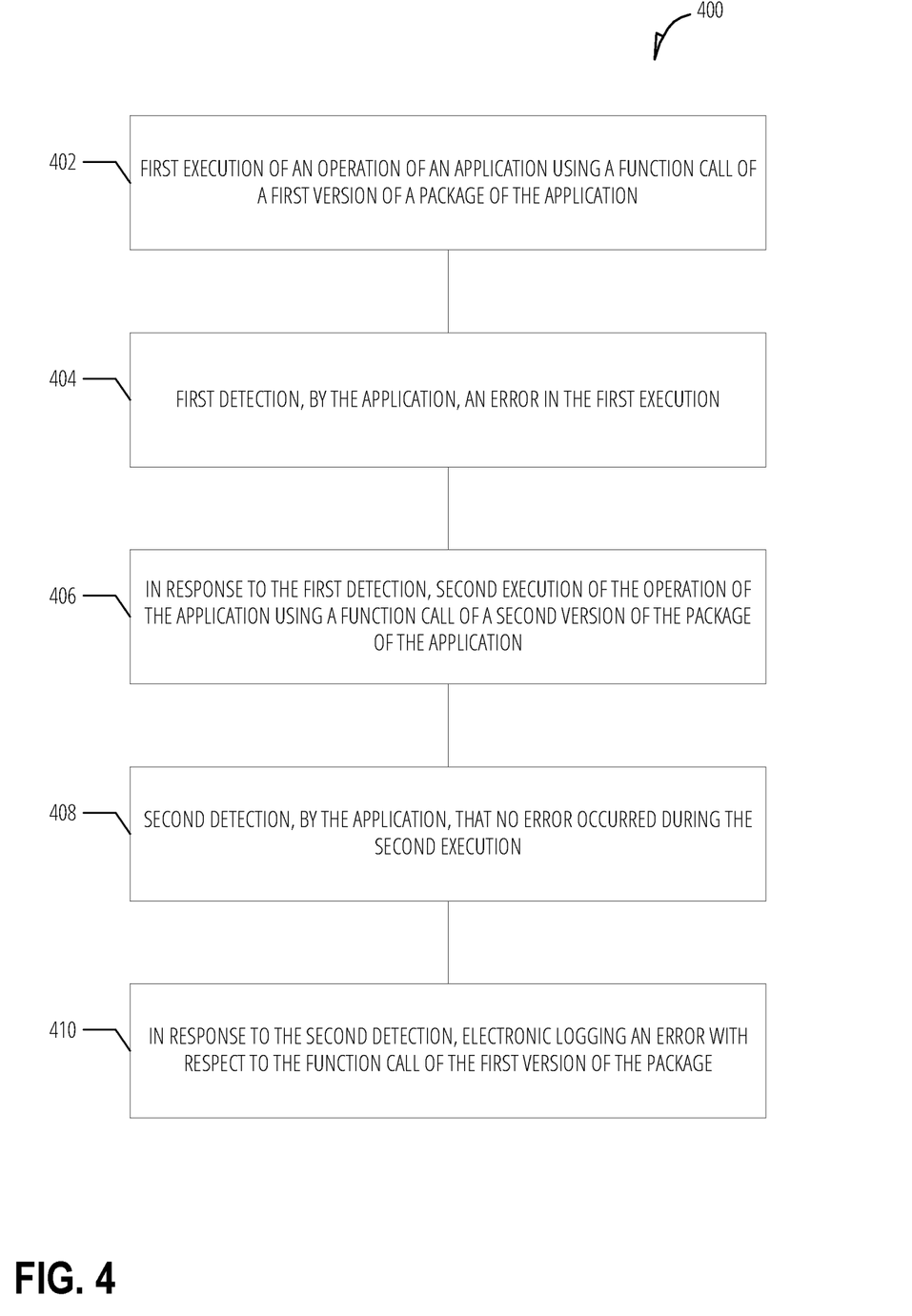
FIG. 4 is a flowchart illustrating a method to execute a function call using two package versions, according to various examples.

FIG. 4 is a flowchart 400 illustrating a method to execute a function call using two package versions, according to various examples. The method is represented as a set of blocks that describe operations 402 to 410 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device (s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, the method may include at operation 402, first executing an operation of an application using a function call of a first version of a package of the application. The use of "first" in this context is for distinguishing between attempts to perform an operation. In some instances, a first and second executing could occur in parallel, such as may be the case if multiple threads of subprocesses are used. The function call may be an operation such as described in the contexts of FIG. 2 and FIG. 3.

In various examples, the method may include at operation 404, first detecting, by the application, an error in the first executing. For example, the function call may fail to execute successfully. In various examples, any error that would normally be displayed to the user upon a failed execution is suppressed.

In various examples, the method may include at operation 406, in response to the first detecting, second executing the operation of the application using a function call of a second version of the package of the application. In various examples, the application includes the first version of the package and the second version of the package. In various examples, the second version of the package of the application is older than the first version of the package of the application.

In various examples, the method may further include receiving an update to the application where the update includes a third version of the package of the application. In response to the receiving, the application may maintain (e.g., keep) the first version of the package, the second version of the package, and the third version of the package as part of the application.

In various examples, the method may include at operation 408, second detecting, by the application, that no error occurred during the second executing. In various examples, the method may include at operation 410, in response to the second detecting, electronically logging an error with respect to the function call of the first version of the package.

In various examples, a user identifier may be indicated (e.g., in a setting of the application) as a current user of the application. In various examples, electronically logging the error with respect to the function call of the first version of the package includes adding an entry for an operational unit for the user identifier and a function name of the function call in a data store.

The method may further include, subsequent to the second executing, receiving a request to perform the operation of the application. The application may determine that the user identifier is still indicated as the current user of the application. Based on this determining, the application may bypass executing the operation of the application using the function call of the first version of the package and execute the operation of the application using the function call of the second version of the package of the application.

In various examples, the method may further include accessing an execution preference for the user identifier that indicates to bypass execution of operations using versions of packages of the application with prior errors logged.

In various examples, subsequent to the second executing, the application may receive a request to perform the operation of the application. At this time, the application may determine that another user identifier is indicated as the current user of the application, and therefore the operational unit is different than with the first user. Based on this determining, the operation of the application may be executed using the function call of the first version of the package.

In various examples, the method may further include receiving a request to perform a second operation of the application and spawning a first thread to execute the second operation of the application using a function call of the first version of the package, and spawning a second thread to execute the second operation of the application using a function call of the second version of the package.

In various examples, the method may further include receiving a request to perform a second operation of the application and third executing the second operation of the application using a function call of the first version of a package of the application. Then, the method may include third detecting, by the application, an error in the third executing. In response to the third detecting, the method may include fourth executing the second operation of the application using a function call of the second version of the package of the application and fourth detecting, by the application, an error in the fourth executing. In response to the third detecting and the fourth detecting, an error may be presented to the user in the application.

Figure 5:
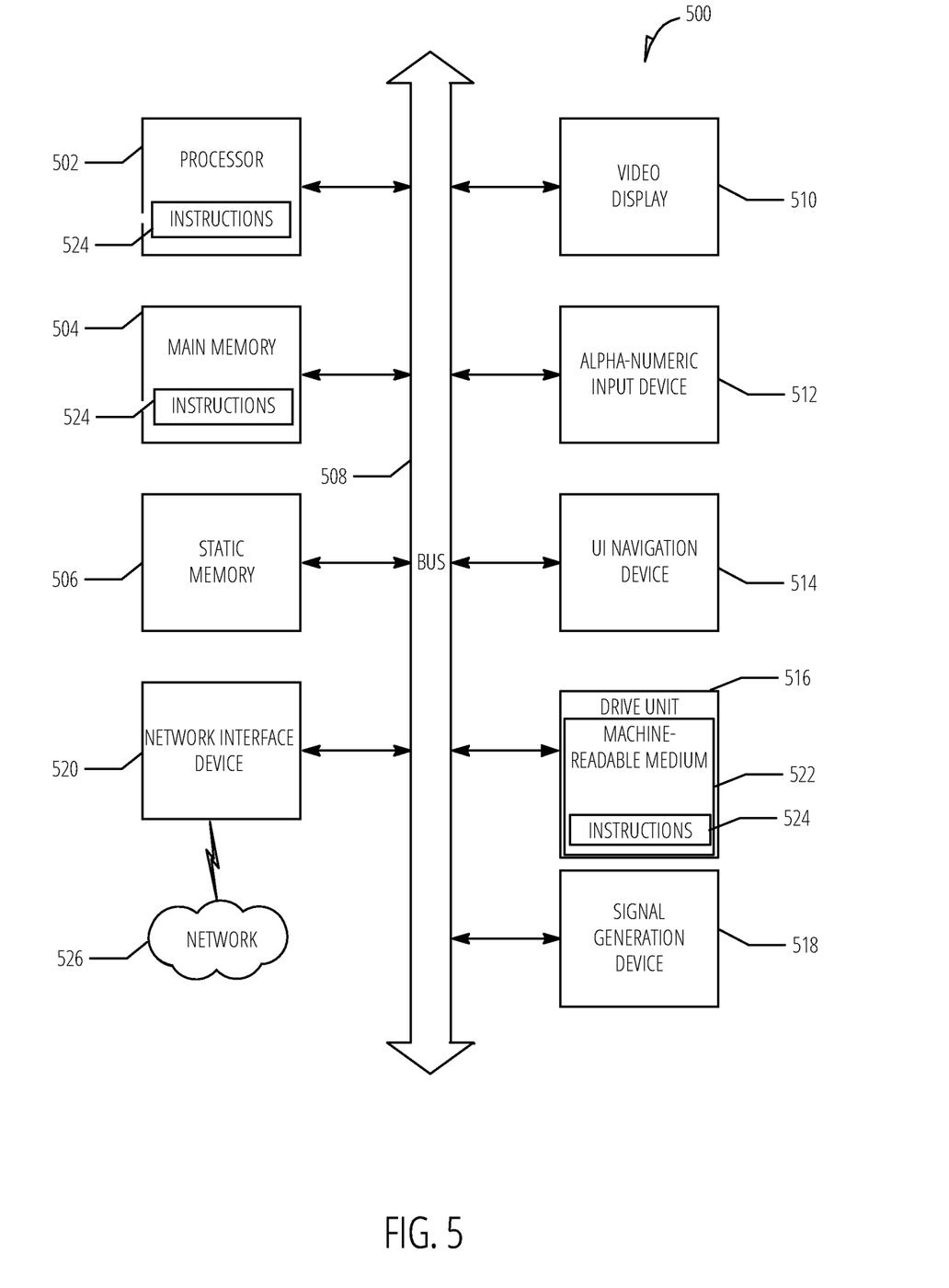
FIG. 5 is a block diagram illustrating a machine in the example form of computer system, within which a set or sequence of instructions may be executed to cause the machine to perform any one of the methodologies discussed herein, according to various examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a bus 508. The computer system 500 may further include a video display 510, an input device 512 (e.g., a keyboard), and a user interface (UI) navigation device 514 (e.g., a mouse). In one embodiment, the video display 510, input device 512, and UI navigation device 514 are incorporated into a single device housing such as a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensors.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed Database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 522 that excluded transitory signals.

The instructions 524 may further be transmitted or received over a communications Network 526 using a transmission medium via the network interface device 520 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein

What is claimed is:

1. A system comprising:
   a processing unit;
   a storage device comprising instructions, which when executed by the processing unit, configure the system to perform operations comprising:
   first executing an operation of an application using a function call of a first version of a package of the application;
   first detecting, by the application, an error in the first executing;
   in response to the first detecting, second executing the operation of the application using a function call of a second version of the package of the application;
   second detecting, by the application, that no error occurred during the second executing; and
   in response to the second detecting, electronically logging an error with respect to the function call of the first version of the package;

subsequent to the second executing, receiving a request to execute the operation of the application;
determining that a user identifier, which is indicated as a current user of the application, is still indicated as the current user of the application;
based on the determining, bypassing executing the operation of the application using the function call of the first version of the package; and
executing the operation of the application using the function call of the second version of the package of the application.

2. The system of claim 1, wherein a user identifier is indicated as a current user of the application.

3. The system of claim 2, wherein electronically logging the error with respect to the function call of the first version of the package includes adding an entry for an operational unit for the user identifier and a function name of the function call in a data store.

4. The system of claim 1, wherein the instructions, which when executed by the processing unit further configure the system to perform operations comprising:
accessing an execution preference for the user identifier, the execution preference indicating to bypass execution of operations using versions of packages of the application with prior errors logged.

5. The system of claim 2, wherein the instructions, which when executed by the processing unit further configure the system to perform operations comprising:
subsequent to the second executing, receiving a request to perform the operation of the application;
determining that another user identifier is indicated as the current user of the application; and
based on the determining, executing the operation of the application using the function call of the first version of the package.

6. The system of claim 1, wherein the application includes the first version of the package and the second version of the package.

7. The system of claim 6, wherein the instructions, which when executed by the processing unit further configure the system to perform operations comprising:
receiving an update to the application, the update including a third version of the package of the application; and
in response to the receiving, maintaining the first version of the package, the second version of the package, and the third version of the package as part of the application.

8. The system of claim 1, wherein the instructions, which when executed by the processing unit further configure the system to perform operations comprising:
receiving a request to perform a second operation of the application;
spawning a first thread to execute the second operation of the application using a function call of the first version of the package; and
spawning a second thread to execute the second operation of the application using a function call of the second version of the package.

9. The system of claim 1, wherein the instructions, which when executed by the processing unit further configure the system to perform operations comprising:
suppressing display of an error after the first detecting.

10. The system of claim 1, wherein the instructions, which when executed by the processing unit further configure the system to perform operations comprising:
receiving a request to perform a second operation of the application;
third executing the second operation of the application using a function call of the first version of a package of the application;
third detecting, by the application, an error in the third executing;
in response to the third detecting, fourth executing the second operation of the application using a function call of the second version of the package of the application;
fourth detecting, by the application, an error in the fourth executing;
in response to the third detecting and the fourth detecting, presenting an error in the application.

11. The system of claim 1, wherein the second version of the package of the application is older than the first version of the package of the application.

12. A computer-readable medium comprising instructions, which when executed by a processing unit, configure the processing unit to perform operations comprising:
first executing an operation of an application using a function call of a first version of a package of the application;
first detecting, by the application, an error in the first executing;
in response to the first detecting, second executing the operation of the application using a function call of a second version of the package of the application;
second detecting, by the application, that no error occurred during the second executing; and
in response to the second detecting, electronically logging an error with respect to the function call of the first version of the package;
subsequent to the second executing, receiving a request to execute the operation of the application;
determining that a user identifier, which is indicated as a current user of the application, is still indicated as the current user of the application;
based on the determining, bypassing executing the operation of the application using the function call of the first version of the package; and
executing the operation of the application using the function call of the second version of the package of the application.

13. The computer-readable medium comprising instructions of claim 12, wherein a user identifier is indicated as a current user of the application.

14. The computer-readable medium comprising instructions of claim 13, wherein electronically logging the error with respect to the function call of the first version of the package includes adding an entry for an operational unit for the user identifier and a function name of the function call in a data store.

15. The computer-readable medium comprising instructions of claim 13, wherein the instructions, which when executed by the processing unit further configure the processing unit to perform operations comprising:
subsequent to the second executing, receiving a request to perform the operation of the application;
determining that the user identifier is still indicated as the current user of the application;
based on the determining, bypassing executing the operation of the application using the function call of the first version of the package;

executing the operation of the application using the function call of the second version of the package of the application.

16. A method comprising:
first executing an operation of an application using a function call of a first version of a package of the application;
first detecting, by the application, an error in the first executing;
in response to the first detecting, second executing the operation of the application using a function call of a second version of the package of the application;
second detecting, by the application, that no error occurred during the second executing;
in response to the second detecting, electronically logging an error with respect to the function call of the first version of the package;
subsequent to the second executing, receiving a request to execute the operation of the application;
determining that a user identifier, which is indicated as a current user of the application, is still indicated as the current user of the application;
based on the determining, bypassing executing the operation of the application using the function call of the first version of the package; and
executing the operation of the application using the function call of the second version of the package of the application.

17. The method of claim 16, wherein a user identifier is indicated as a current user of the application.

18. The method of claim 17, wherein electronically logging the error with respect to the function call of the first version of the package includes adding an entry for an operational unit for the user identifier and a function name of the function call in a data store.

19. The method of claim 17, further comprising:
subsequent to the second executing, receiving a request to perform the operation of the application;
determining that the user identifier is still indicated as the current user of the application;
based on the determining, bypassing executing the operation of the application using the function call of the first version of the package;
executing the operation of the application using the function call of the second version of the package of the application.

* * * * *